Sept. 26, 1933.   J. P. RUDYK   1,928,267
BRAKE LEVER PERMITTING THE COMBINED CONTROL
OF BRAKES AND ACCELERATOR IN A UNIT
Filed Sept. 1, 1931
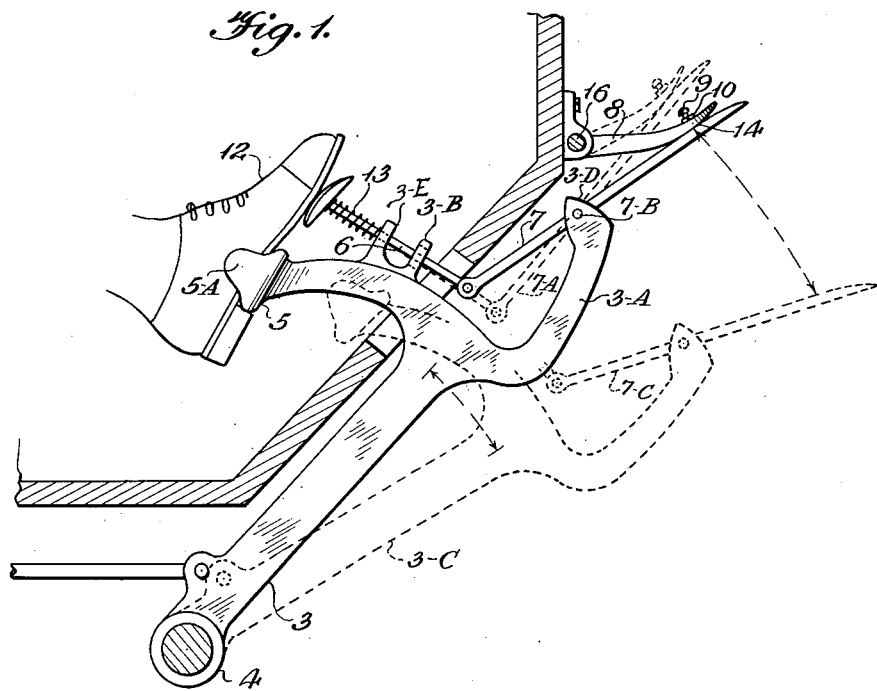
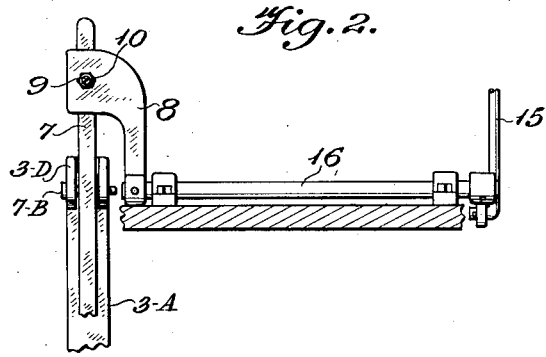
Inventor
John P. Rudyk Patented Sept. 26, 1933

1,928,267

UNITED STATES PATENT OFFICE 1,928,267

BRAKE LEVER PERMITTING THE COMBINED CONTROL OF BRAKES AND ACCELERATOR IN A UNIT

John P. Rudyk, Chevy Chase, Md.

Application September 1, 1931. Serial No. 560,557

10 Claims. (Cl. 74—81)

My invention relates to the combined control of brakes and accelerator, in the form of either an attachment or an integral part of the construction or design of a mechanism, being particularly adapted to automobiles but is not limited thereto.

The primary object of this invention is to provide a unitary control of an accelerator in combination with the brake or clutch pedal in such a manner that each will perform its separate functions independently of the other with absolute safety and full efficiency.

A further object is to provide for the free acceleration of a motor vehicle with the foot resting upon the brake or clutch pedal in instant readiness to apply the same should the necessity arise.

A further object is to provide an instantaneous and automatic cut-off in the acceleration of fuel to the carburetor of an automotive vehicle when the brake or clutch pedal is actuated in performing its primary function of retarding the speed or stopping such vehicles.

A further object is to permit the free application of the brake lever without effecting acceleration when downward pressure is exerted in applying the said brake.

With these and other objects and advantages in mind the invention consists of the novel combination of elements, construction and arrangement of parts and operations to be more fully described hereinafter, claimed and illustrated in the accompanying drawing wherein:

Figure 1 is a diagrammatic side view of the invention in the usual position of the brake on any automotive vehicle.

Figure 2 is an elevational view of the throttle actuating lever as it contacts with the throttle control lever.

Referring in detail to the drawing the invention comprises a brake lever 3 pivoted at 4 of novel design so constructed that all supports, pivots and guides for the accelerator control are a part thereof in one continuous form. The continuous parts that represent a novel design and construction in a brake or clutch lever are designated as 3—A, being an extension serving as a pivot member for the throttle actuating lever 7, and a centering support designated as 3E, a slotted support designated as 3B, both functioning as guides for the accelerator control rod C.

Brake lever 3 is shown in its usual position with respect to the floor board 11 and the operator's foot 12 is shown pivoting on the crowned pedal 5 and held in position by side extensions 5—A.

In practice, operator's foot 12 resting upon pedal 5 as a pivot exerts a downward pressure upon accelerator control rod 6 held in its proper position by spring 13, forcing throttle actuating lever 7 downward into the position designated by 7—A and being pivoted at point 7—B actuates upward the throttle control lever 8 pivoted at 16 and making contact at 14 which is the point of contact through which throttle control is exerted and likewise broken as represented by diagram 3—C and 7—C illustrating the position of lever 3 applied to engage brakes controlled thereby.

Adjustment to compensate for ordinary wear at contact point 14 between throttle actuating lever 7 and throttle control lever 8 is provided by adjusting screw 9, locked in proper position by lock nut 10.

In Figure 2, throttle actuating lever 7 is shown in position relative to throttle control lever 8 which, when pushed upward exerts its directional force upon rod 15 connected to the throttle valve of the fuel carburetor. In this Figure 2, accelerator control rod is indicated by 6, and lever extension 3—A supports pivot bolt 7—B through which throttle actuating lever 7 pivots in its contact with throttle control lever 8.

In the normal driving position as shown in Figure 1, increasing the fuel flow through the throttle valve of a carburetor is accomplished by a downward pressure of the foot 12 upon accelerator control rod 6 which effect is exerted progressively by throttle actuating lever 7 through the adjustable contact at 14 to the throttle control lever 8, and then to throttle rod 15, only while brake lever 3 is in its usual stationary position. Upon the application of the slightest pressure in the desire to apply the brakes it is obvious that immediately contact 14 will be broken, automatically disengaging throttle actuating lever 7 from throttle control lever 8 and leaving the brakes to be engaged with the accelerator control mechanism wholly disconnected and the motor at idling speed.

The organization of the component parts of this mechanism in a position directly above a conventional brake lever which embodies a shank extending upward as a pivoting member, the functioning of the acceleration and braking operations in combination and independently at the same degree of efficiency as is possible with the present practice of maintaining separate controls. Due to the extending shank 3A, Figure 1, being in a position above and extending beyond the stem of lever 3 whereby it supports and pivots lever 7 by means of a formed extremity designated at 3D; the exertion of braking pressure upon pedal 5 results in a proportionately greater movement at point 14 by separating lever 7 and lever 8 at a velocity greater than the velocity of the downward movement of pedal 5. This is as a result of the natural law of leverage, whereby the downward movement of the upper extremity, 3D, is greater than the downward movement of pedal 5, both rocking upon a pivot, 4, at the lower extremity of the common lever 3. The operation of this principle obviates any possibility of pressure upon accelerator rod 6 causing contact with lever 8 by means of lever 7 under any operative circumstances while pedal 5 is being depressed in the application of the brakes.

It is to be understood that the form of my invention herein shown and described is to be taken as a preferred example of the same and that various changes in the shape, size and arrangement of parts may be resorted to without departing from the spirit of the invention or the scope of the subjoined claims.

What I claim as new and novel and desire to secure and protect by Letters Patent of the United States is:

1. In a combined controlling mechanism for motor vehicles; an independent means of applying braking power; comprising a brake lever; an angular shank thereto; an extending shank; and independent means of controlling acceleration; comprising an accelerator rod mounted above the angular shank; a lever connected to said accelerator rod; said lever supported and pivoted at the extremity of the extending shank; said lever in abutting contact to a fuel controlling lever; whereby there will be an automatic break in said acceleration control by means of an operative movement of said independent brake lever; said breaking in acceleration control proceeding at a more rapid rate than movement of the angular shank a lesser radial distance from the pivot of said brake lever than the extremity of said lever in abutting contact to said fuel controlling lever.

2. A combination brake lever; comprising a stem; a shank angular thereto; a pedal thereon; a shank extending beyond said stem, a slotted extremity on said extending shank; an accelerator operating rod above said shank angular to said stem; a centering guide for said accelerator rod above shank angular to said stem; a slotted guide for said accelerator rod above shank angular to said stem; a lever connected to said accelerator rod; said lever pivotally fulcrumed upon the slotted extremity on said extending shank; a fuel controlling lever; said lever actuating the fuel controlling lever by means of an abutting contact; said controlling lever connected to a carburetor fuel controlling lever.

3. A combination brake lever; comprising a stem, a shank angular thereto, an extending shank projecting beyond said stem; a means of acceleration in conjunction with said brake lever comprising an accelerating mechanism, a rod controlled by a spring; a lever connected to said rod, said lever pivoted upon said extending shank; said extending shank formed to provide free movement of said lever; said extending shank having an upper extremity slotted and pivoted to support said lever; said lever abutting a fuel controlling lever; an adjusting screw and lock nut mounted upon said fuel controlling lever.

4. A brake lever having a pedal, and a projection extending a greater radial distance from the pivot of the brake lever than the pedal, accelerator means supported on the brake lever adjacent the pedal, a lever pivotally mounted on the projecting means and connected at one end to the accelerator means and operatively engaging an accelerator control means at its other end, whereby the accelerator will be automatically disconnected upon actuation of the brake lever.

5. In a control; a combination of a means of applying braking power comprising a pivoted brake lever having a pedal at one extremity, and a shank extending from said brake lever to a point a greater radial distance from the pivot of said brake lever than said pedal terminating in another extremity; with means of acceleration, including a throttle actuating member; said throttle actuating member pivoted on said extending shank a greater radial distance from the pivot of said brake lever than said pedal; said throttle actuating member in engagement with fuel throttle control means.

6. In a control: pivoted braking means comprising a brake lever having a pedal, and an extending shank supporting an acceleration actuating member a greater radial distance from the pivot of said braking means than said pedal; said acceleration actuating member in engagement with fuel throttle control means; whereby the velocity of said braking means in applying braking power is less than the velocity of said acceleration actuating member in breaking said engagement with said fuel throttle control means.

7. In a control: pivoted braking means comprising a brake lever having a pedal, and an extending shank pivoting an acceleration actuating member a greater radial distance from the pivot of said braking means than said pedal; said acceleration actuating member in engagement with fuel throttle control means a greater radial distance from the pivot of said braking means than the pivot of said acceleration actuating member on said extending shank: whereby upon the application of braking power the velocity of said braking means is greater than the velocity of said acceleration actuating member in engaging said fuel throttle control means.

8. In a control; a combination of braking means and acceleration means differentially engaging fuel throttle control means; said braking means comprising a brake lever having a pedal and an extending shank supporting and pivoting said acceleration means, including a throttle actuating member, a greater radial distance from the pivot of said brake lever than said pedal; said acceleration means, including said throttle actuating member, in engagement with said fuel throttle control means a greater radial distance from the pivot of said brake lever than its pivoting axis on said extending shank; whereby the movement of said braking means in applying braking power is of greater mechanical advantage than the movement of said acceleration means in engagement with said fuel throttle control means.

9. In a control, a combination of acceleration means, including a throttle actuating member, with pivoted braking means having a pedal, including a brake lever, means supporting said acceleration means integral with said braking means and a greater radial distance from said pivot than said pedal, including a shank extending from said pivoted braking means supporting and pivoting said throttle actuating member, whereby the velocity of said pedal is less than the velocity of said throttle actuating member supported and pivoted on said supporting means of a greater radial distance from the pivot of said braking means.

10. A differential combination of brake and acceleration mechanisms, comprising means of applying braking power, including a pivoted brake lever having a pedal and means extending a greater radial distance from the pivot of said brake lever than said pedal, and acceleration means, including an actuating member, pivoted and supported on said extending means in abutting contact to fuel throttle control means, said actuating member and said fuel throttle controlling means effecting an abutting contact a greater radial distance from the pivot of said brake lever than said pedal.

JOHN P. RUDYK.